US010623373B2

(12) United States Patent
Grant et al.

(10) Patent No.: US 10,623,373 B2
(45) Date of Patent: *Apr. 14, 2020

(54) METHODS AND APPARATUS TO PROVIDE A DISTRIBUTED FIREWALL IN A NETWORK

(71) Applicant: AT&T Intellectual Property I, L.P., Atlanta, GA (US)

(72) Inventors: Dustin Grant, Fall City, WA (US); Sandeep Gupta, Milpitas, CA (US); Sridhar Narahari, Milpitas, CA (US); Michael J. Satterlee, Clifton Park, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 382 days.

This patent is subject to a terminal disclaimer.

(21) Appl. No.: 15/594,010

(22) Filed: May 12, 2017

(65) Prior Publication Data

US 2017/0250955 A1    Aug. 31, 2017

Related U.S. Application Data

(63) Continuation of application No. 14/271,185, filed on May 6, 2014, now Pat. No. 9,674,147.

(51) Int. Cl.
*G06F 21/00* (2013.01)
*H04L 29/06* (2006.01)
*H04L 29/08* (2006.01)

(52) U.S. Cl.
CPC ...... *H04L 63/0263* (2013.01); *H04L 63/0218* (2013.01); *H04L 63/20* (2013.01); *H04L 67/10* (2013.01)

(58) Field of Classification Search
CPC . H04L 63/0263; H04L 63/20; H04L 63/0218; H04L 67/10
See application file for complete search history.

(56) References Cited

U.S. PATENT DOCUMENTS 5,922,051 A    7/1999  Sidey
6,226,372 B1   5/2001  Beebe et al.
(Continued)

FOREIGN PATENT DOCUMENTS

EP    2466832    6/2012
EP    2648370    10/2013
(Continued)

OTHER PUBLICATIONS

Chowdhury, NM Mosharaf Kabir, and Raouf Boutaba. "Network virtualization: state of the art and research challenges." Communications Magazine, IEEE 47.7 (Jul. 2009): 20-26.
(Continued)

*Primary Examiner* — Kendall Dolly
(74) *Attorney, Agent, or Firm* — Hanley, Flight & Zimmerman, LLC

(57) ABSTRACT

Methods and apparatus to provide a distributed firewall in a network are disclosed. An example method includes identifying, at a control plane, a network traffic rule to implement in a network, and determining a first firewall of a distributed firewall in the network to enforce the network traffic rule. Example methods also configure a first software-defined network node to route network traffic to the first firewall. The first firewall is instantiated by a first firewall instance at a second software-defined network node and by a second firewall instance at a third software-defined network node. In response to determining at least some of the network traffic forwarded by the first software-defined network node to the second and third software-defined network nodes is being dropped at the first and second firewall instances, example
(Continued)

methods also cause the first software-defined network node to implement a third firewall instance.

14 Claims, 5 Drawing Sheets

(56) References Cited

U.S. PATENT DOCUMENTS

| | | | |
|---|---|---|---|
| 6,317,837 | B1 | 11/2001 | Kenworthy |
| 6,584,454 | B1 | 6/2003 | Hummel, Jr. et al. |
| 7,509,493 | B2 | 3/2009 | Koti et al. |
| 7,818,565 | B2 | 10/2010 | Miller et al. |
| 7,844,731 | B1 | 11/2010 | Zhou |
| 8,032,933 | B2 | 10/2011 | Turley et al. |
| 8,089,187 | B2 | 1/2012 | Budde et al. |
| 8,307,419 | B2 | 11/2012 | Richardson et al. |
| 8,397,282 | B2 | 3/2013 | Turley et al. |
| 8,565,108 | B1 | 10/2013 | Marshall et al. |
| 8,578,015 | B2 | 11/2013 | Billhartz |
| 8,612,744 | B2 | 12/2013 | Shieh |
| 8,661,153 | B2 | 2/2014 | Ta et al. |
| 2003/0167410 | A1 | 9/2003 | Rigstad et al. |
| 2004/0015719 | A1 | 1/2004 | Lee et al. |
| 2006/0129808 | A1 | 6/2006 | Koti et al. |
| 2012/0174184 | A1* | 7/2012 | Hyndman ........... H04L 63/0218 726/1 |
| 2013/0152188 | A1* | 6/2013 | Karels ................. H04L 63/0209 726/12 |
| 2013/0272253 | A1 | 10/2013 | Veenstra et al. |

FOREIGN PATENT DOCUMENTS

| | | |
|---|---|---|
| EP | 2667548 | 11/2013 |
| WO | 2002044871 | 5/2003 |
| WO | 2013139298 | 9/2013 |

OTHER PUBLICATIONS

Arif, Moiz, Abdullah Nafis Khan, and Saad Iftikhar. "Virtualization in Networks A survey," Transactions on Networks and Communications 1.1 (Dec. 19, 2013) (15 pages).

Anderson, Thomas, et al. "Overcoming the Internet impasse through virtualization," Computer 38.4 (Apr. 2005): 34-41.

Nygren, Erik L., Stephen J. Garland, and M. Frans Kaashoek. "PAN: A high-performance active network node supporting multiple mobile code systems." Open Architectures and Network Programming Proceedings, 1999. OPENARCH'99. 1999 IEEE Second Conference on. IEEE, 1999 (15 pages).

Smith, Jonathan M., et al. "Activating networks: a progress report." Computer 32.4 (Nov. 13, 1998): (20 pages).

Jaeger, R., et al. "Integrating Active Networking and Commercial Grade Routing Platforms." (Mar. 20, 2000): (10 pages).

Wilkinson, Glenn. "An Investigation into Network Emulation and the Development of a Custom Network." (Nov. 2007): (64 pages).

United States Patent and Trademark Office, "Non-Final Office Action", issued in connection with U.S. Appl. No. 14/271,185, dated Sep. 13, 2016 (15 pages).

United States Patent and Trademark Office, "Notice of Allowance", issued in connection with U.S. Appl. No. 14/271,185, dated Jan. 27, 2017 (10 pages).

* cited by examiner

METHODS AND APPARATUS TO PROVIDE A DISTRIBUTED FIREWALL IN A NETWORK

RELATED APPLICATIONS

This patent arises from a continuation of U.S. patent application Ser. No. 14/271,185, entitled, "METHODS AND APPARATUS TO PROVIDE A DISTRIBUTED FIREWALL IN A NETWORK," filed May 6, 2014 (now U.S. Pat. No. 9,674,147). Priority to U.S. patent application Ser. No. 14/271,185 is claimed and U.S. patent application Ser. No. 14/271,185 is hereby incorporated herein by reference in its entirety

BACKGROUND

In known communications networks, network functions are performed using specialized hardware that accelerates one or more functions relative to general-purpose machines. Control and configuration of the network is generally performed by accessing a device to be configured and performing configuration tasks specific to the hardware in the device.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
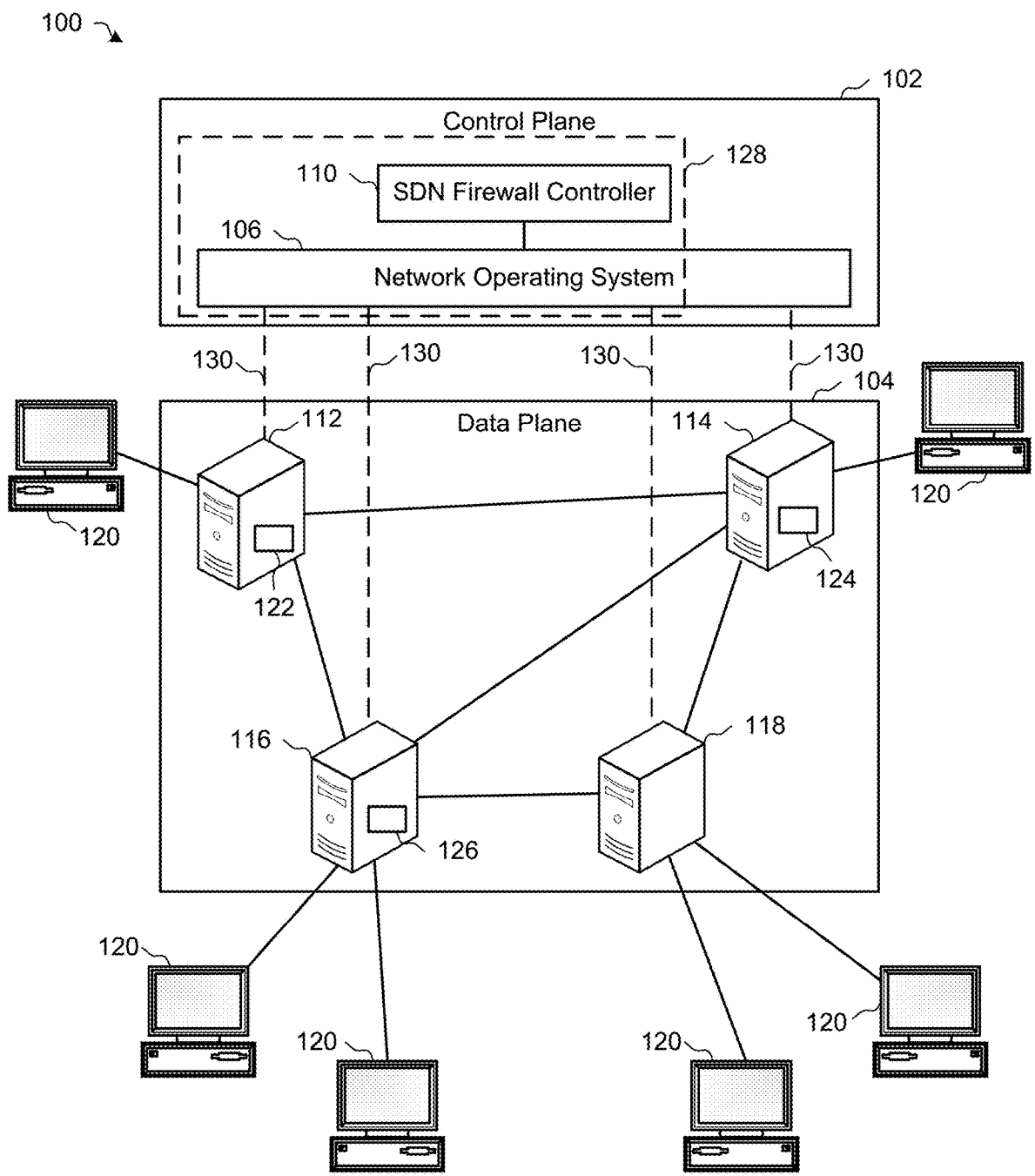
FIG. 1 is a block diagram of an example software-defined network constructed in accordance with the teachings of this disclosure to provide a distributed firewall in the software-defined network.

Software-defined networking (SDN) is a network technology that addresses customization and optimization concerns within networks. SDN simplifies modern networks by decoupling the data-forwarding capability (e.g. the data plane or forwarding plane) from routing, resource, and other management functionality (e.g., the control plane). Both the control plane and data plane functions are performed at the network nodes in known networks. Network nodes that support SDN (e.g., that are SDN-compliant) may be configured to implement data plane functions. Control plane functions are performed by an SDN controller. SDN networks currently use Application Programming Interface (API) services, such as the OpenFlow protocol or OnePK protocol, to manage the interactions between the data plane and the control plane.

Known implementations of network firewalls are centralized and operate independently of other firewalls and network elements. Known methods of operating firewalls independently of each other leads to requirements including a) funneling traffic (e.g., all traffic on the network) from the entry points through the firewalls to apply firewall policies and/or b) placing firewalls in every physical or logical location that a policy is needed, which increases infrastructure costs. Firewall hardware costs, limits on scalability, management costs, and deployment complexity limits the number of firewalls that can be cost-effectively deployed in a network. As a result, network traffic using known firewalls often must traverse a substantial portion of the network to reach the firewall. When such traffic is dropped due to the firewall policies, network capacity used to carry the dropped traffic to the firewall is wasted.

Examples disclosed herein solve problems associated with known firewall implementations by using SDN to provide a distributed firewall application. In some examples, the distributed firewall application permits any and/or every SDN node or element in a software-defined network to be programmed to provide firewall services, thereby reducing the need for funneling traffic and decreasing infrastructure costs.

Examples disclosed herein deploy and manage instances of the firewall from a central management server or SDN node (e.g., an SDN firewall controller). SDN firewall controllers in disclosed examples define and analyze firewall policies for implementation in software-defined networks. As a result, security policies can be applied throughout a network (e.g., closer to data entry points rather than closer to a data destination). Examples disclosed herein enable the network to change a network wide security policy as often as needed to maintain network security and performance. For example, example networks may update the firewall policies across the network, as often as every time a user logs onto the network, to accommodate the security policy of that specific user, the device(s) the user is using to access the network, and the resources to which the user needs access. In contrast, known firewalls are updated only when a firewall policy update can be designed for each type of firewall in the network. Thus, in contrast to the relatively static firewalls of known networks, example SDN firewalls disclosed herein are dynamic and adapt to the current circumstances and use(s) of the network.

Examples disclosed herein identify, at a control plane, a network traffic rule to implement in a network; determine, at the control plane, a distributed firewall for a first firewall in the network to enforce the network traffic rule; instruct, using the control plane, a first software-defined networking node to instantiate the first firewall of the distributed firewall; configure a second software-defined networking node to route network traffic through the first firewall; and instruct the first software-defined networking node to enforce the network traffic rule.

In some examples, instructing the first software-defined networking node to instantiate the first firewall includes instructing the first software-defined networking node to instantiate a virtual machine to implement a firewall software application. Some examples further include instructing a third software-defined networking node to modify a first firewall policy of a second firewall at the third software-defined networking node to enforce the network traffic rule.

In some such examples, instructing the third software-defined networking node includes instructing the third software-defined networking node to execute the second firewall using the first firewall policy, and instructing the first software-defined networking node to enforce the network traffic rule comprises instructing the first software-defined networking node to execute the first firewall using a second firewall policy, the first firewall policy being independent from the second firewall policy. In some examples, the first and second firewalls are part of the distributed firewall.

In some examples, the first software-defined networking node is an edge network node. Some examples further identify, at the control plane, a change to the network traffic rule to implement in the network; identify, at the control plane, a set of software-defined networking nodes on which firewalls of the distributed firewall are implemented; and transmit instructions from the control plane to the set of software-defined networking nodes to cause the firewalls to implement the change to the network traffic rule, the instructions to the software-defined networking nodes in the set being respectively customized for the firewall to which the instructions are transmitted.

In some examples, determining the distributed firewall for the network to enforce the network traffic rule includes determining, at the control plane, a portion of the network to which the network traffic rule is to be applied; identifying, at the control plane, software-defined networking nodes in the network to serve the portion of the network; transmitting instructions to a first portion of the identified software-defined networking nodes to cause the first portion of the identified software-defined networking nodes to instantiate respective firewall software applications; and transmitting instructions to the identified software-defined networking nodes to cause the identified software-defined networking nodes to implement the traffic rule via respective firewall software applications.

FIG. 1 is a block diagram of an example software-defined network 100 constructed in accordance with the teachings of this disclosure to provide a distributed firewall in the software-defined network 100. The example software-defined network 100 is divided into a control plane 102 and a data plane 104. The example control plane 102 is implemented using one or more SDN nodes (e.g., computing devices), but is illustrated in FIG. 1 as a single logical entity.

The control plane 102 includes one or more control devices that execute a network operating system 106 to control (e.g., configure, monitor) devices in the data plane 104. The example network operating system 106 executes one or more SDN applications including an SDN firewall controller 110. The example network operating system 106 supports the SDN firewall controller 110 and/or any additional SDN applications executed at the network operating system 106.

As disclosed below in more detail, the example SDN firewall controller 110 controls, via the network operating system 106, a distributed firewall that is implemented via the data plane 104. As described in more detail below, the distributed firewall provides network traffic filtering to enhance security, reliability, and/or efficiency of the network. The distributed firewall of the example of FIG. 1 may include firewall services for private or virtual private networks, and/or any other firewall services (e.g., specialized firewall services) desired by users of the network.

The example data plane 104 of FIG. 1 includes SDN nodes 112-118 (e.g., computing devices, network nodes) that implement the functions of the network (e.g., filtering, routing, etc.) for network traffic. The example SDN nodes 112-118 are controlled (e.g., configured) by the example control plane 102 (e.g., by the network operating system 106), which accesses application programming interfaces (APIs) of the SDN nodes 112-118 to configure the network services being provided by the SDN nodes 112-118. In some examples, the network operating system 106 abstracts all or part of the APIs of the SDN nodes 112-118 for access by the SDN firewall controller 110. Abstracting the APIs enables the SDN firewall controller to access the API via the network operating system 106 using a consistent set of commands and/or configuration routines, which are then implemented by the network operating system 106 on the desired nodes 112-118 (e.g., nodes indicated as arguments in the API call) using device-specific commands and/or configuration routines.

The example SDN nodes 112-118 operate as gateways, edge routers, and/or core routers. The SDN nodes 112-118 are configurable by the control plane 102 to implement any set or subset of SDN services. Examples of SDN services include routing, traffic filtering, and/or load balancing. The example network operating system 106 of FIG. 1 configures respective devices 120, which may be consumer devices, routers, gateways, and/or edge routers, and/or SDN nodes implementing such consumer and/or networking devices, to route traffic to the SDN nodes 112-118 based on forwarding tables and/or other rules.

In the example of FIG. 1, each of the SDN nodes 112, 114, and 116 implements a respective firewall instance 122, 124, 126. Each of the firewall instances 122-126 may be configured by the SDN firewall controller 110 independently of other ones of the firewall instances 122-126. Accordingly, examples disclosed herein treat each of the firewall instances 122-126 as instances of a firewall service. However, the firewall instances 122-126 collectively provide a distributed firewall for the software-defined network 100 to implement the firewall strategy as it is defined at the SDN firewall controller 110.

In the example of FIG. 1, the SDN node 118 does not implement an instance of the distributed firewall service (e.g., a firewall instance). Instead, the network operating system 106 and/or the SDN firewall controller 110 configures the SDN node 118 (e.g., a gateway, an edge router) to route network traffic through one or more of the SDN nodes 114, 116, which are executing firewall instances 124, 126. In some cases, routing the traffic to the SDN node(s) 114, 116 for filtering via the firewall instances 124, 126 is problematic. For example, if substantial amounts of network traffic are forwarded by the SDN node 118 to the SDN nodes 114, 116 only to be dropped by the firewall instances 124, 126, the forwarding resources of the SDN nodes 114-118 are wasted on the dropped traffic. Additionally or alternatively, one or both of the firewall instances 124, 126 may become bottlenecks in traffic flow from the devices 120 due to traffic entering the network 100 at the SDN nodes 114, 116, traffic forwarded by the SDN node 118 to the SDN nodes 114, 116, or both.

When the example SDN firewall controller 110 recognizes these or other problems, the SDN firewall controller 110 of the illustrated example may alleviate the problem by instantiating a firewall service at the SDN node 118. In contrast to known networks that require specialized firewall hardware to be physically installed and/or configured, the example SDN firewall controller 110 of FIG. 1 transmits instructions to the SDN node 118 via the network operating system 106 to cause the SDN node 118 to instantiate a new firewall instance in software, thereby enhancing the performance of the firewall services of the software-defined network 100 and adapting the firewall strategy to real time network conditions. The example software-defined network 100 illustrated in FIG. 1 can nearly instantly respond to network conditions involving the distributed firewall.

The SDN nodes implementing the control plane 102 in the example of FIG. 1 are different nodes than the SDN nodes 112, 114, 116, 118 implementing the data plane 104. For example, the control plane 102 may include one or more SDN nodes 128 to implement the network operating system 106 and/or the SDN firewall controller 110. The example SDN nodes 128 of the control plane 102 communicate with the nodes 112-118 via control paths of the network 130. While only 5 nodes 112-118, 128 are shown in the example network 100 of FIG. 1, a network may have hundreds, thousands, or more nodes. In some examples, one or more SDN nodes 112, 114, 116, 118 implementing the data plane 104 also implement the control plane 102.

Figure 2:
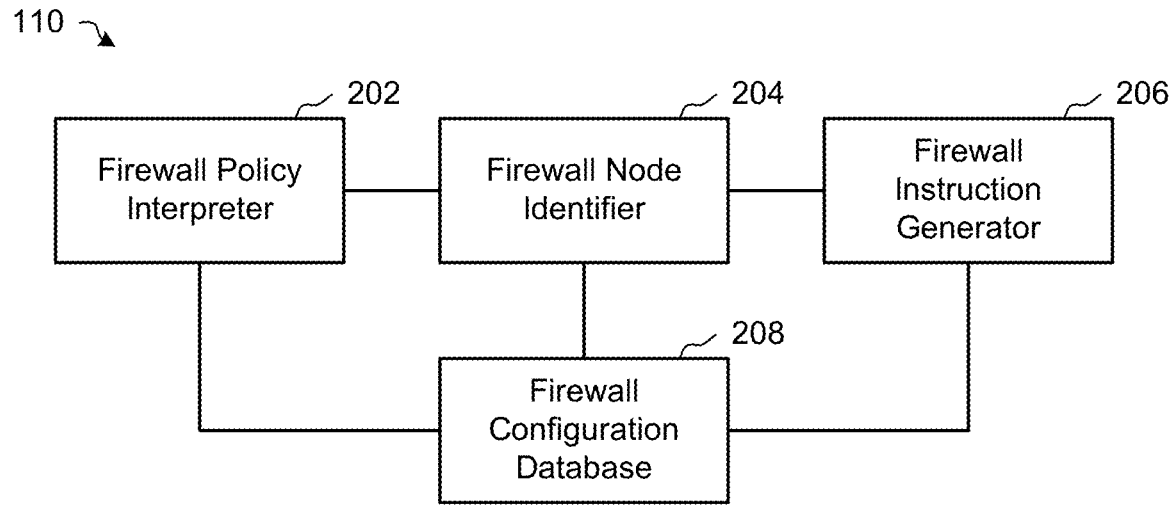
FIG. 2 is a block diagram of an example software-defined networking firewall controller constructed in accordance with the teachings of this disclosure to control a distributed firewall in a software-defined network.

FIG. 2 is a block diagram of an example implementation of the example SDN firewall controller 110 of FIG. 1. The example SDN firewall controller 110 of FIG. 2 is implemented on one or more SDN nodes (e.g., the SDN node 128 of FIG. 1), which may be separate from SDN nodes 112-118 implementing the data plane 104 and/or may also implement the data plane 104.

The example SDN firewall controller 110 of FIG. 2 includes a firewall policy interpreter 202, a firewall node identifier 204, a firewall instruction generator 206, and a firewall configuration database 208. In the example of FIG. 1, firewall configuration (e.g., all firewall configuration) occurs via the SDN firewall controller 110 and/or is controlled by the SDN firewall controller 110. Thus, the example SDN firewall controller 110 of the illustrated example has knowledge of the firewall configuration of the software-defined network 100 and implements any and all user firewall configuration commands (e.g., all configuration commands) at the firewall nodes. The example SDN firewall controller 110 of the illustrated example also has (and/or can rapidly obtain from the network operating system 106) knowledge of the physical and/or logical topologies of the software-defined network 100 and/or the statuses (e.g., configurations, operational statuses, etc.) of the nodes 112-118.

In the example of FIG. 2, the SDN firewall controller 110 (e.g., via the firewall policy interpreter 202 of FIG. 2) receives and/or identifies network traffic rules for implementation in the software-defined network 100. For example, a network administrator may define and/or provide a filtering policy or rule to the firewall policy interpreter 202 for instructing the software-defined network 100 to drop packets having a particular source Internet Protocol (IP) address. Another example rule may include granting a defined group of users in a system (e.g., a "marketing" group, a "field technicians" group, etc.) access to a designated set of applications in a corporate virtual private network. Rules provided manually may be provided using a user interface, a rule description language, and/or any other interface mechanism implemented in the software-defined network 100.

Additionally or alternatively, the example firewall policy interpreter 202 may receive a firewall policy or rule that is automatically generated by a security service based on activity in the network (e.g., by traffic analysis of the software-defined network). For example, the firewall policy interpreter 202 may receive a firewall rule to temporarily block traffic destined for a particular port at a particular IP address. The example firewall policy interpreter 202 may determine that the firewall rule is to be implemented at each firewall instance 122-126 in the software-defined network 100 (e.g., to drop packets matching the filter rule as early as possible).

The example firewall node identifier 204 of the illustrated example determines a firewall configuration (e.g., identifies firewall nodes) for the software-defined network 100 to enforce the network traffic rule. For example, some network traffic rules may affect only a limited number of firewall applications and/or SDN nodes 112-118. The example firewall rule may then be selectively applied to the firewall instances and/or applications executing on those SDN nodes 112-118 to reduce the processing resource requirement on SDN nodes 112-118 that do not need to implement the policy. On the other hand, other network traffic rules may require all of the firewall instances in the software-defined network 100 to be instructed to implement the traffic rule.

In some examples, the firewall policy interpreter 202 determines that the distributed firewall is a traffic bottleneck at a particular node. In some such examples, the firewall node identifier 204 may determine that creating one or more additional firewall instances at designated nodes 112-118 (which may or may not already have a firewall instance such as the node 118 of FIG. 1) are to be created to handle the traffic, and/or that the traffic destined for the bottleneck firewalls may be redistributed to other SDN nodes 112-118 executing the firewall instances and/or applications.

The firewall node identifier 204 of the example of FIG. 2 determines the appropriate instances 122-126 and/or nodes 112-118 of FIG. 1 for efficient implementation of the firewall, including adding firewall instances, migrating firewall instances between nodes, eliminating firewall instances, and/or updating firewall instances and/or routing forwarding tables of other nodes 112-118 and/or devices 120.

The example firewall instruction generator 206 of FIG. 2 instructs (e.g., via the network operating system 106) the appropriate SDN node 112-118 to instantiate firewall(s). For example, the firewall instruction generator 206 generates instructions for transmission to a first one of the SDN nodes 112-118 (e.g., to the SDN node 112 via an SDN API of the SDN node 112). In this example, the instructions cause the SDN node 112-118 to instantiate a virtual machine and implement (e.g., install, load, etc.) a firewall application for execution on the virtual machine. The SDN node(s) 112-118 provide the hardware (e.g., computing, communications) resources used by the corresponding virtual machine(s) and the firewall application(s) to perform the firewall actions. In some examples, a given SDN node 112-118 is already executing one or more firewall instances and instantiates an additional firewall instance in response to the instruction from the firewall instruction generator 206.

The example firewall configuration database 208 of FIG. 2 stores the firewall configuration of the software-defined network 100. For example, the firewall configuration database 208 stores the locations of the firewall instances 122-126 (e.g., physical locations and/or virtual locations), the firewall policies and/or rules configured at the firewall instances 122-126, and/or portions of the software-defined network that are served by the firewall instances 122-126. For example, some firewall instances may be configured to serve a particular virtual private local area network, while other firewall instances may be configured to serve traffic routed through a public network. In some examples, a subset of gateways, edge routers, and/or core routers in the network 100 are served by a particular firewall instance (e.g., executing on one or more of the SDN node(s) 112-118).

In the illustrated example, when a firewall instance is created at an SDN node 112-118, the example firewall node identifier 204 selects the gateways, edge routers, and/or core routers and the firewall instruction generator 206 configures them to route traffic for filtering by the firewall instance. The example firewall configuration database 208 of FIG. 2 stores the information associated with the newly-instantiated firewall instance for reference by the firewall policy interpreter 202, the firewall node identifier 204, and/or the firewall instruction generator 206.

In the example of FIG. 2, the example firewall configuration database 208 also stores firewall audit logs obtained from the firewall instances in response to success/fail audits of the firewall instances. Additionally or alternatively, the firewall configuration database 208 stores notable network events from the firewall instances. The example firewall policy interpreter 202 of the illustrated example analyzes the disparate network events from the firewall instances that are distributed across the software-defined network 100 to identify traffic trends (e.g., increasing traffic from and/or in a portion of the network) and/or identify distributed attacks (e.g., distributed denial of service attacks). In response to identifying trends and/or attacks, the firewall policy interpreter 202 of FIG. 2 generates remedial firewall rules or policies for implementation at the firewall instances.

In the example of FIG. 2, after instructing an SDN node 112-118 to create a firewall instance (or if the firewall instance is already present), the example firewall instruction generator 206 configures one or more other software-defined networking nodes (e.g., network gateways, edge routers, etc.) to route network traffic through the firewall instance. In some examples, the firewall node identifier 204 identifies ones of the SDN nodes 112-118 and/or the devices 120 in the software-defined network 100 that are to be configured to route traffic to the newly-instantiated firewall instance.

The example firewall instruction generator 206 also instructs the firewall instance executing on the SDN node 112-118 to enforce the network traffic rule as interpreted by the firewall policy interpreter 202. For example, the firewall instruction generator 206 generates and sends instructions to the firewall instance via the network operating system 106.

Figure 3:
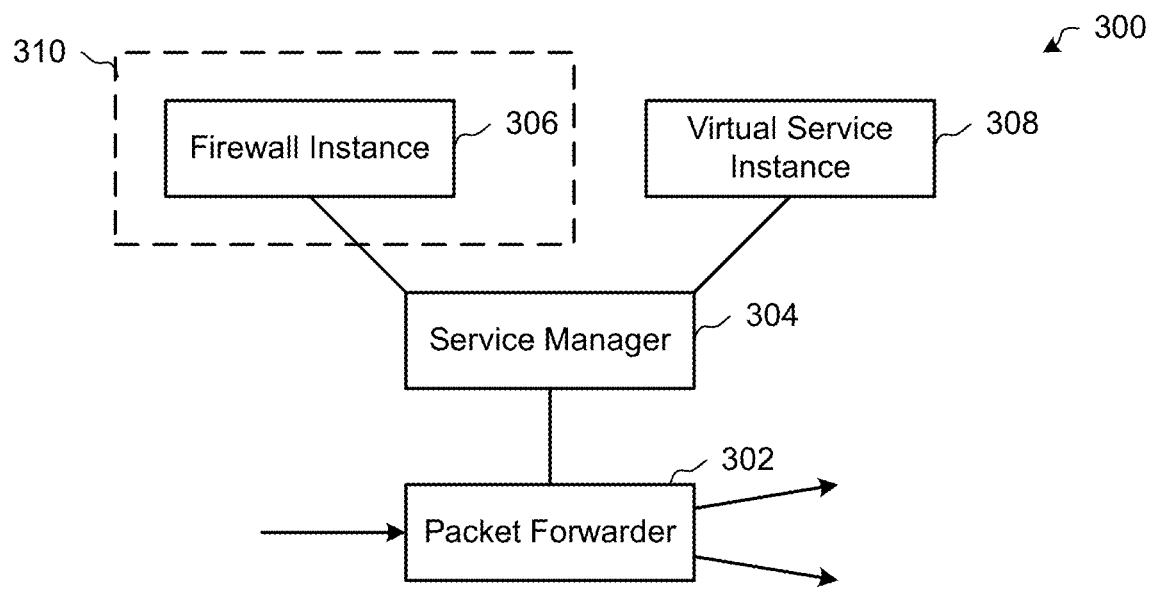
FIG. 3 is a block diagram of an example SDN node to implement a firewall policy.

FIG. 3 is a block diagram of an example SDN node 300 to implement a firewall policy. The example SDN node 300 of FIG. 3 may implement any of the example SDN nodes 112-118 of FIG. 1. The example SDN node 300 of FIG. 3 includes a packet forwarder 302, a service manager 304, a firewall instance 306, and one or more other virtual service instance(s) 308.

The example packet forwarder 302 of FIG. 3 executes on the underlying hardware of the SDN node 300, including processor(s), memory, and/or communications interfaces (e.g., incoming data ports, outgoing data ports, hardware interconnects, etc.). The example packet forwarder 302 of this example receives network traffic (e.g., data packets), processes the traffic in accordance with the services executing on the SDN node 300 (e.g., the firewall instance 306 and/or other virtual service instances 308), and forwards the traffic or drops the traffic accordingly. In some examples, the packet forwarder 302 executes on and/or is implemented by multiple scalable hardware devices controlled as a single logical device by the service manager 304.

The example service manager 304 of FIG. 3 manages services executing on the SDN node 300 and provides an interface between the services 306, 308 and the packet forwarder 302. For example, the service manager 304 may include a virtual machine manager that manages virtual machines 310 implementing SDN services and/or software applications. Examples of such services that are managed by the service manager 304 include the firewall instance 306.

The service manager 304 may support any number of virtual services. Additionally or alternatively, the service manager 304 provides access for the firewall instance 306 to the hardware resources of the packet forwarder 302 to, for example, enable the firewall instance 306 to apply the firewall rules to the traffic received at the packet forwarder 302. In some examples, the service manager 304 configures the firewall instance 306 such that the firewall instance 306 logically receives the traffic that is received at the packet forwarder 302. The service manager 304 further provides the firewall instance 306 with the processing resources to apply the firewall rules to the packet forwarder 302.

The service manager 304 of FIG. 3 exposes an API that may be accessed by the network operating system 106 and/or the SDN firewall controller 110 of FIG. 1. For example, the service manager 304 receives instructions from the SDN firewall controller 110 of FIG. 1 via the API for implementing and/or configuring the firewall instance 306 (and/or additional firewall instances). The service manager 304 instantiates the firewall instance 306 in a virtual machine 310, for example, in response to an instruction from the firewall instruction generator 206 to instantiate a firewall.

In some examples, the service manager 304 exposes a specialized API in response to instantiating the firewall instance 306. For example, the example service manager 304 provides configuration information to the firewall instance 306 when the service manager 304 receives, via a public or private firewall API (e.g., an API that provides access to functions specific to the firewall) of the service manager 304, instructions from the firewall instruction generator 206 that include configuration instructions.

While an example manner of implementing the software-defined network 100, the SDN firewall controller 110, and the SDN nodes 112-118 is illustrated in FIGS. 1, 2, and 3, one or more of the elements, processes and/or devices illustrated in FIGS. 1, 2, and 3 may be combined, divided, re-arranged, omitted, eliminated and/or implemented in any other way. Further, the example control plane 102, the example data plane 104, the example network operating system 106, the example SDN firewall controller 110, the example SDN nodes 112-118, the example devices 120, the example firewall services 122-126, the example firewall policy interpreter 202, the example firewall node identifier 204, firewall instruction generator 206, firewall configuration database 208, the example packet forwarder 302, the example service manager 304, the example firewall instance 306 and/or, more generally, the example service-defined network 100 of FIG. 1 may be implemented by hardware, software, firmware and/or any combination of hardware, software and/or firmware. Thus, for example, any of the example control plane 102, the example data plane 104, the example network operating system 106, the example SDN firewall controller 110, the example SDN nodes 112-118, the example devices 120, the example firewall services 122-126, the example firewall policy interpreter 202, the example firewall node identifier 204, firewall instruction generator 206, firewall configuration database 208, the example packet forwarder 302, the example service manager 304, the example firewall instance 306 and/or, more generally, the example service-defined network 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example control plane 102, the example data plane 104, the example network operating system 106, the example SDN firewall controller 110, the example SDN nodes 112-118, the example devices 120, the example firewall services 122-126, the example firewall policy interpreter 202, the example firewall node identifier 204, firewall instruction generator 206, firewall configuration database 208, the example packet forwarder 302, the example service manager 304, and/or the example firewall instance 306 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example service-defined network 100 of FIG. 1 may include one or more elements, processes and/or devices in addition to, or instead of, those illustrated in FIGS. 1, 2, and/or 3, and/or may include more than one of any or all of the illustrated elements, processes and devices.

Figure 4:
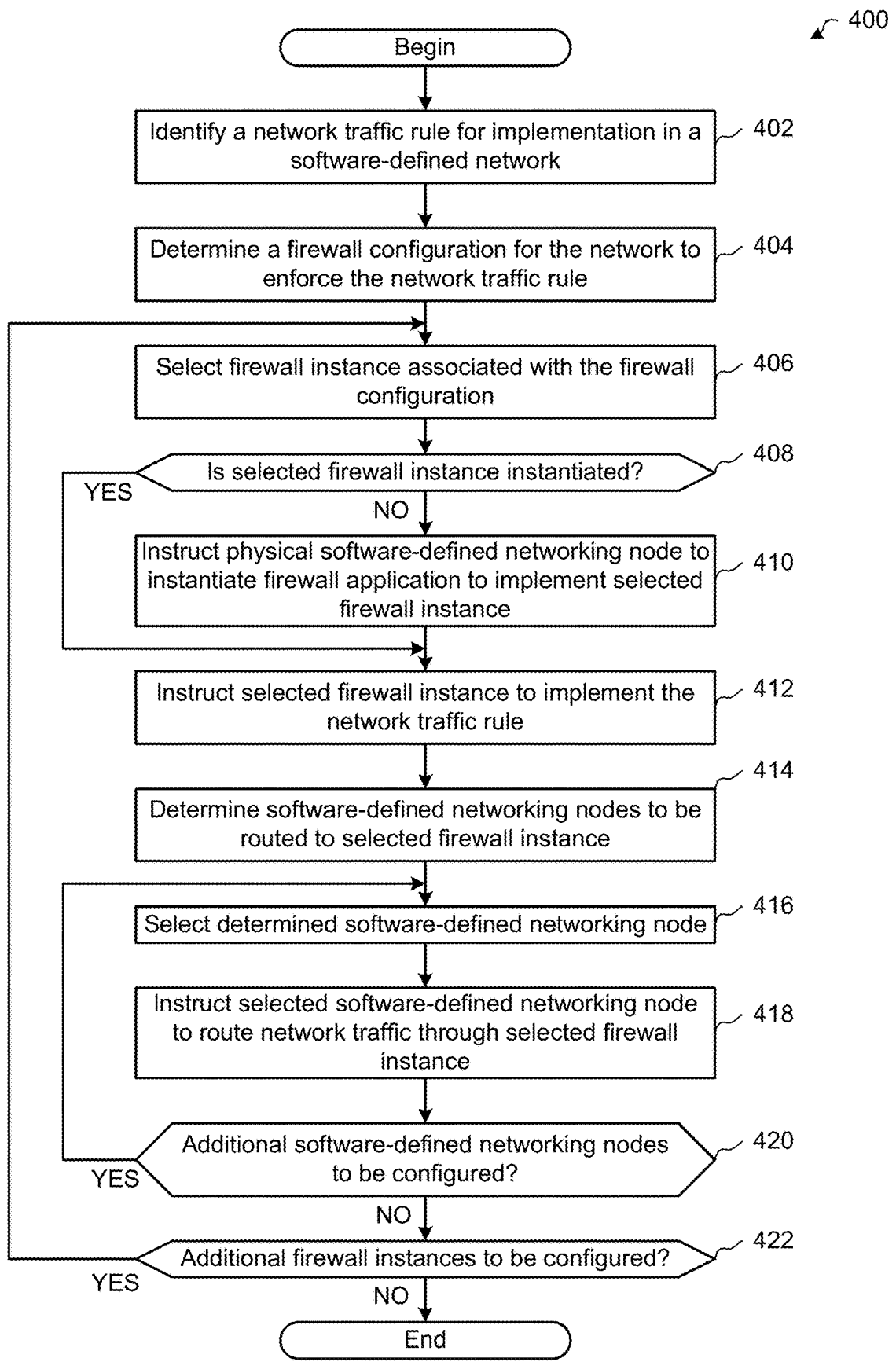
FIG. 4 is a flowchart representative of example machine readable instructions which may be executed to implement the example software-defined networking firewall controller of FIGS. 1 and/of 2 to control a distributed firewall in a software-defined network.
Figure 5:
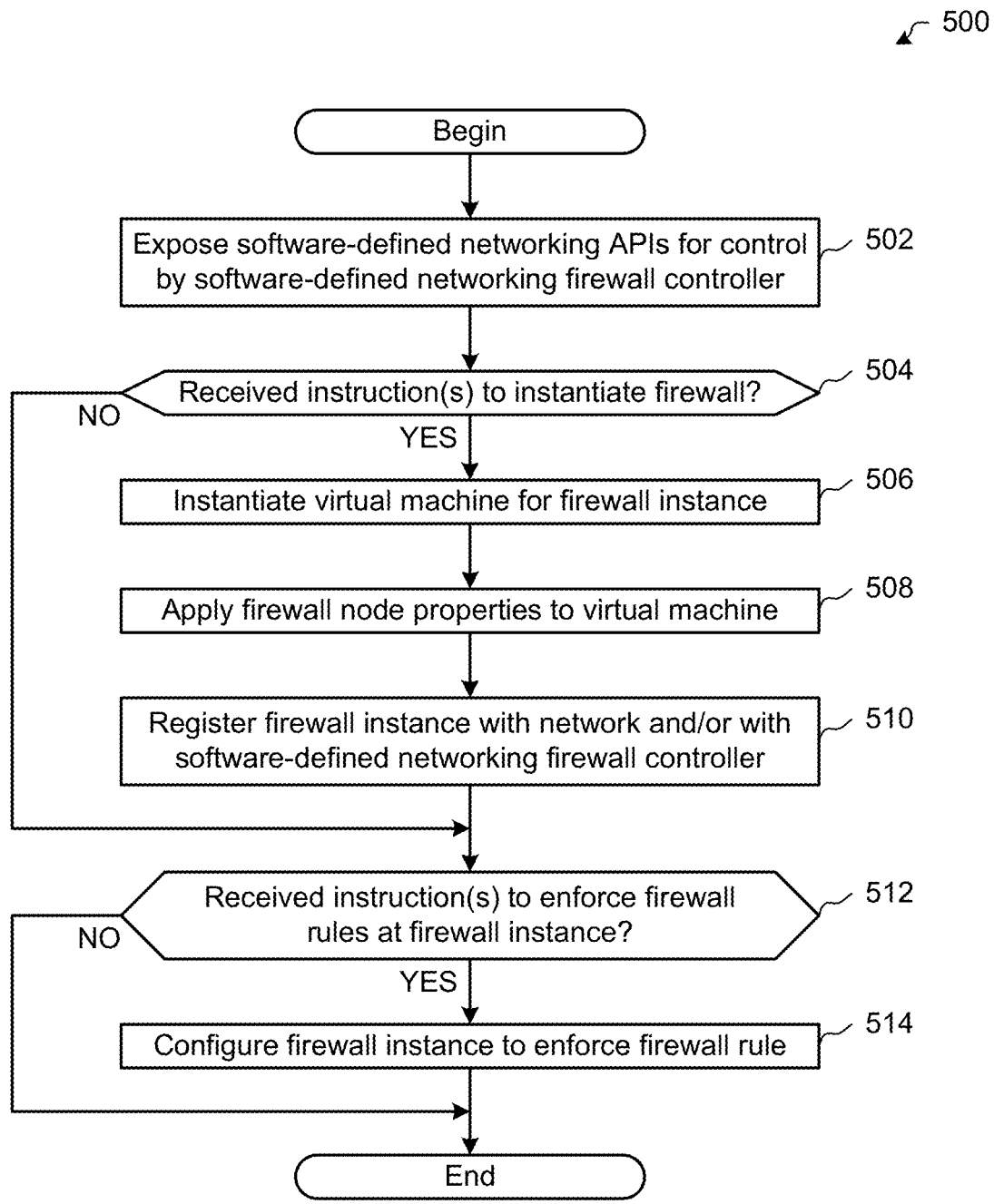
FIG. 5 is a flowchart representative of example machine readable instructions which may be executed to implement the example software-defined networking node of FIGS. 1 and/or 3 to implement a distributed firewall policy.

Flowcharts representative of example machine readable instructions for implementing the SDN firewall controller 110 and/or the SDN node 300 of FIGS. 1, 2, and/or 3 are shown in FIGS. 4 and 5. In this example, the machine readable instructions comprise programs for execution by a processor such as the processor 612 shown in the example processor platform 600 discussed below in connection with FIG. 6. The programs may be embodied in software stored on a tangible computer readable storage medium such as a CD-ROM, a floppy disk, a hard drive, a digital versatile disk (DVD), a Blu-ray disk, or a memory associated with the processor 612, but the entire programs and/or parts thereof could alternatively be executed by a device other than the processor 612 and/or embodied in firmware or dedicated hardware. Further, although the example programs are described with reference to the flowcharts illustrated in FIGS. 4 and 5, many other methods of implementing the example SDN firewall controller 110 and/or the example SDN node 300 may alternatively be used. For example, the order of execution of the blocks may be changed, and/or some of the blocks described may be changed, eliminated, or combined.

As mentioned above, the example processes of FIGS. 4 and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flowchart representative of example machine readable instructions 400 which may be executed to implement the example SDN firewall controller 110 of FIGS. 1 and/or 2 to control a distributed firewall in the software-defined network 100 of FIG. 1.

The example firewall policy interpreter 202 of FIG. 2 identifies a traffic rule for implementation in a software-defined network (block 402). For example, the firewall policy interpreter 202 may receive a rule configuration from an administrator of the software-defined network 100 and/or may receive a network traffic rule from a traffic analyzer. The example firewall policy interpreter 202 determines a firewall configuration for the network to enforce the network traffic rule (block 404). For example, the firewall policy interpreter 202 may determine a physical location, a virtual location, a subset of the network 100 to be served by the rule, traffic characteristics to result in filtering traffic, and/or any other configuration details to implement the network traffic rule.

The example firewall node identifier 204 selects a firewall instance associated with the firewall configuration (block 406). For example, the firewall instance may be selected based on network conditions and/or the firewall policy being enacted. The example firewall node identifier 204 determines whether the selected firewall instance is instantiated (block 408). For example, the firewall node identifier 204 may determine whether a firewall instance determined by the firewall rule interpreter 202 as part of the rule is identified or stored in the firewall configuration database 208. If the selected firewall instance is not instantiated (block 408), the example firewall instruction generator 206 instructs a physical SDN node (e.g., one of the SDN nodes 112-118, 300 of FIGS. 1 and/or 3) to instantiate a firewall application (e.g., the firewall services 122-126, 306 of FIGS. 1 and/or 3) (block 410). For example, the firewall instruction generator 206 generates instructions to access the API of the SDN node 300. The instructions cause the SDN node 300 to instantiate a virtual machine 310 and to implement the firewall service on the newly-instantiated virtual machine 310.

After instructing the physical SDN node to instantiate the firewall application (block 410), or if the selected firewall instance is already instantiated (block 408), the example firewall instruction generator 206 instructs the selected firewall instance to implement the network traffic rule (block 412). For example, the firewall instruction generator 206 generates an instruction including firewall rule configuration information and transmits the instruction to the SDN node 112-118, 300 implementing the selected firewall instance. On receipt, the firewall instance adds, modifies, and/or removes applicable firewall filtering rules to implement the network traffic rule.

The example firewall node identifier 204 determines the SDN nodes that are to be routed to the selected firewall instance (block 414). The firewall node identifier 204 selects one of the determined SDN nodes (block 416) and the firewall instruction generator 206 instructs the selected SDN node to route network traffic through the selected firewall instance (block 418). For example, the firewall instruction generator 206 may instruct one or more gateways, edge routers, and/or core routers to route applicable network traffic to the selected firewall instance (e.g., instead of a firewall instance to which the selected SDN node was previously directing traffic).

The example firewall node identifier 204 of this example determines whether there are any additional SDN nodes to be configured (block 420). If there are additional SDN nodes (as needed address current network conditions and/or the desired firewall configuration responsive to the needs of the current network) (block 420), control returns to block 416 to select another SDN node. When there are any additional SDN nodes to be configured (block 420), the example firewall node identifier 204 determines whether there are any additional firewall instances to be configured (as needed address current network conditions and/or the desired firewall configuration responsive to the needs of the current network) (block 422). If there are additional firewall instances to be configured (block 422), control returns to block 406 to select another firewall instance. When there are no additional firewall instances (block 422), the example instructions 400 of FIG. 4 end.

FIG. 5 is a flowchart representative of example machine readable instructions 500 which may be executed to implement the example SDN nodes 112-118, 300 of FIGS. 1 and/or 3 to implement a distributed firewall policy.

The example service manager 304 of FIG. 3 exposes SDN APIs for control by an SDN firewall controller (e.g., the SDN firewall controller 110 via the network operating system 106 of FIG. 1) (block 502). In some examples, the SDN APIs are public APIs that may be used by other SDN services or applications to control services on the SDN node 300. In some other examples, one or more SDN APIs are private APIs that are exposed when the firewall instance 306 is instantiated at the SDN node 300.

The example service manager 304 of the illustrated example determines whether instruction(s) have been received (e.g., from the SDN firewall controller 110) to instantiate a firewall (block 504). If instruction(s) have been received to instantiate a firewall (block 504), the example service manager 304 instantiates a virtual machine for the firewall instance (block 506). The example service manager applies firewall node properties (e.g., install firewall application components, basic SDN properties associated with the SDN node 300, etc.) to the virtual machine (block 508). In some examples, the firewall instance 306 is executed upon application of the firewall properties and begins filtering network traffic received at the SDN node 300 (e.g., at the packet forwarder 302) in accordance with the properties of the firewall instance 306.

The example service manger 304 of FIG. 3 registers the firewall instance 306 with the network (e.g., with the operating system 106) and/or with the SDN firewall controller 110. For example, a registration message may be returned to the SDN firewall controller 110 as a response to an access of the API by the SDN firewall controller 110.

After registering the firewall instance 306 (block 510), and/or if instructions have not been received to instantiate the firewall instance (block 504), the example service manager 304 of FIG. 3 determines whether instruction(s) have been received to enforce firewall rule(s) at the firewall instance 306 of the SDN node (block 512). For example, the service manager 304 may receive configuration information from the SDN firewall controller 110 via the same API, a different public API, and/or a private, firewall-specific API. The instruction(s) to enforce a firewall rule may include, for example, new and/or updated traffic filtering rules, load balancing rules, and/or any other firewall implementation rules determined by the SDN firewall controller 110 to be implemented (at least partially) at the firewall instance 306.

If instruction(s) to enforce firewall rules have been received (block 512), the example service manager 304 and/or the firewall instance 306 configure the firewall instance 306 to enforce the firewall rule (block 514). After configuring the firewall instance 306 (block 514), or if instruction(s) to enforce the firewall rule have not been received (block 512), the example instructions 500 of FIG. 5 end. In some other examples, blocks 504-514 may be repeated to maintain exposed SDN APIs for configuration by the control plane 102 (e.g., via the SDN firewall controller 110).

Figure 6:
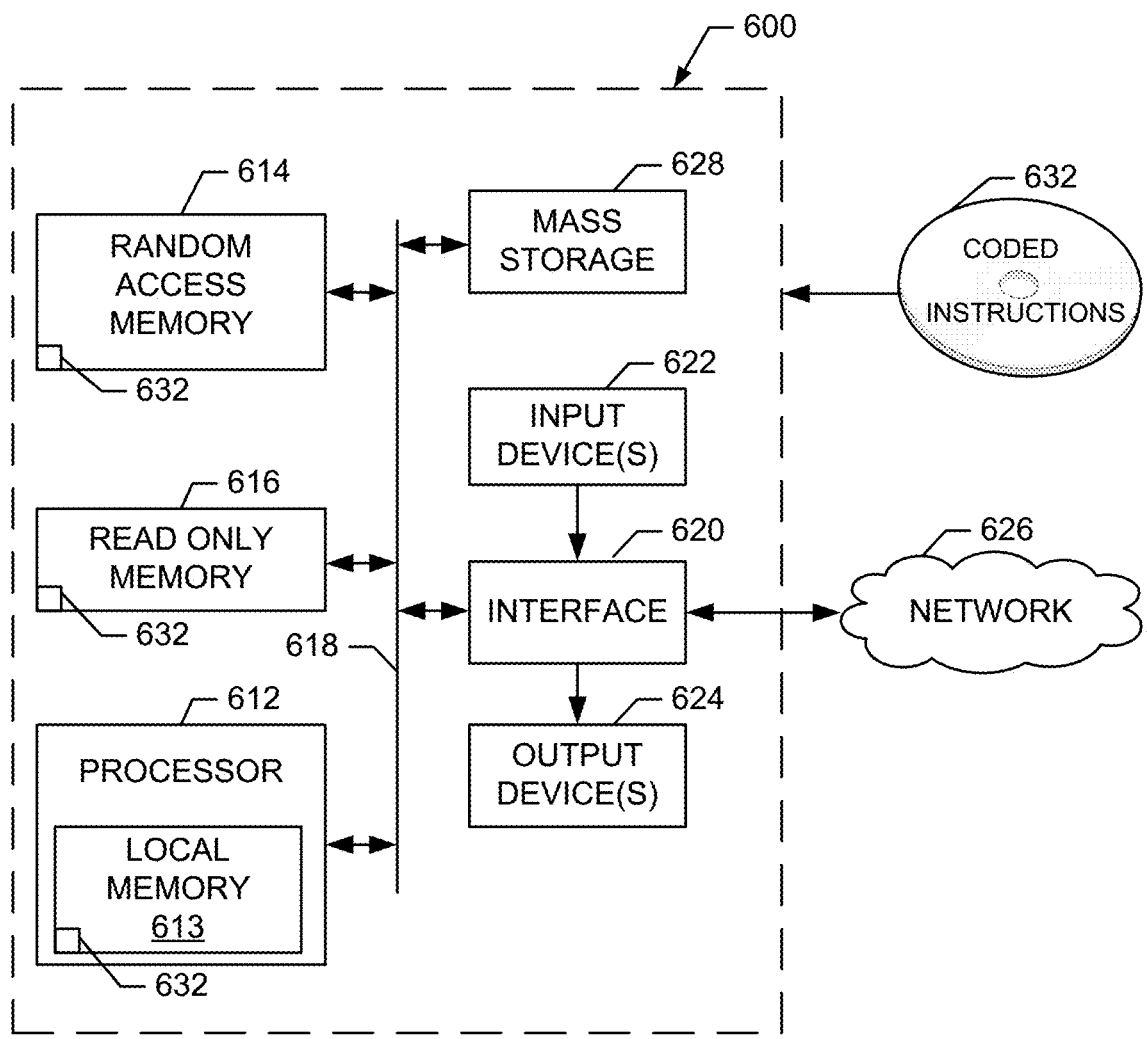
FIG. 6 is a block diagram of an example processor platform capable of executing the instructions of FIGS. 4 and/or 5 to implement the apparatus of FIGS. 1, 2, and/or 3.

FIG. 6 is a block diagram of an example processor platform 600 capable of executing the instructions of FIGS. 4 and/or 5 to implement the SDN firewall controller 110 and/or the SDN node 300 of FIGS. 1, 2, and/or 3. The processor platform 600 can be, for example, a server, a personal computer, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626

(e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 4 and/or 5 may be stored in the mass storage device 628, in the volatile memory 614, in the non-volatile memory 616, and/or on a removable tangible computer readable storage medium such as a CD or DVD.

Examples disclosed herein have advantages over known firewalls that include reducing the complexity of network design and network security implementation. Examples disclosed herein also enable deployment of security policies throughout entire networks such that, in contrast to networks using known firewalls, network attacks or other restricted traffic can be blocked prior to exposing the network nodes to the attacks or restricted traffic.

Examples disclosed herein also increase the performance of entire networks (relative to known firewalls) because the network is freed from carrying restricted traffic additional hops toward the destination before the traffic can be filtered. Examples disclosed herein may be structured to distribute the firewall at or closer to the edges of the network, which allows each firewall to filter smaller numbers of traffic flows, and (in contrast to known centralized firewalls that must have highly-scalable throughput) to successfully block large numbers of traffic flows at concentrated locations. In some cases, the entire software-defined network can be configured to function as a firewall at each SDN node, rather than as a network that includes attached firewalls.

Relative to known firewalls, examples disclosed herein are more adaptable to current network conditions. For example, example firewalls disclosed herein are adaptable to current users and/or traffic patterns of a network that enable the firewall policies of the network to be efficiently applied.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    identifying, by executing an instruction with one or more processors, at a control plane, a network traffic rule to implement in a network;
    determining, by executing an instruction with the one or more processors, at the control plane, a first firewall of a distributed firewall in the network to enforce the network traffic rule, the first firewall being instantiated by a first firewall instance at a second software-defined network node and by a second firewall instance at a third software-defined network node;
    instructing the second software-defined network node to instantiate the first firewall instance by instructing the second software-defined network node to instantiate a first virtual machine to implement a first firewall application;
    instructing the third software-defined network node to instantiate the second firewall instance by instructing the third software-defined network node to instantiate a second virtual machine to implement a second firewall application;
    configuring a first software-defined network node to route network traffic to the first firewall; and
    in response to determining at least some of the network traffic forwarded by the first software-defined network node to at least one of the second or third software-defined network nodes is being dropped by at least one of the first firewall instance or the second firewall instance, causing the first software-defined network node to implement a third firewall instance.

2. The method defined in claim 1, wherein the first, second and third firewall instances of the first firewall operate to form at least a portion of the distributed firewall.

3. The method defined in claim 1, further including:
    analyzing network event data collected at the first and second firewall instances; and
    based on the analyzing, determining at least some of the network traffic forwarded by the first software-defined network node to the second software-defined network node is being dropped by the first firewall instance, or at least some of the network traffic forwarded by the first software-defined network node to the third software-defined network node is being dropped by the second firewall instance.

4. The method defined in claim 1, further including:
    analyzing network event data collected from a plurality of firewall instances, including the first and the second firewall instances; and
    based on the analyzing, generating at least one of a remedial rule or a remedial policy to be implemented by at least some of the plurality of firewall instances.

5. The method defined in claim 1, further including:
    identifying a second network traffic rule that affects a subset of a plurality of software-defined network nodes, the plurality of software-defined network nodes including the first, second and third software-defined network nodes; and
    causing firewall instances instantiated at the subset of the plurality of software-defined network nodes to enforce the second network traffic rule.

6. A first software-defined network node, comprising:
    a processor; and
    a memory including computer readable instructions which, when executed, cause the processor to perform operations, the operations including:
        identifying, at a control plane, a network traffic rule to implement in a network;
        determining, at the control plane, a first firewall of a distributed firewall in the network to enforce the network traffic rule;
        configuring a second software-defined network node to route network traffic to the first firewall, the first firewall being instantiated by a first firewall instance at a third software-defined network node and by a second firewall instance at a fourth software-defined network node;
        directing the third software-defined network node to instantiate the first firewall instance by directing the third software-defined network node to instantiate a first virtual machine to implement a first firewall application;
        directing the fourth software-defined network node to instantiate the second firewall instance by directing the fourth software-defined network node to instantiate a second virtual machine to implement a second firewall application; and in response to determining at least some of the network traffic forwarded by the second software-defined network node to at least one of the third software-defined network node or the fourth software-defined network node is being dropped by at least one of the first firewall instance or the second firewall instance, causing the second software-defined network node to implement a third firewall instance.

7. The first software-defined network node defined in claim 6, the operations further including:

analyzing network event data collected at the first and second firewall instances; and based on the analyzing of the network event data, determining at least some of the network traffic forwarded by the second software-defined network node to the third software-defined network node is being dropped at the first firewall instance, or at least some of the network traffic forwarded by the second software-defined network node to the fourth software-defined network node is being dropped at the second firewall instance.

8. The first software-defined network node defined in claim 6, the operations further including:

analyzing network event data collected from a plurality of firewall instances, including the first and the second firewall instances;

based on the analyzing of the network event data, generating at least one of a remedial rule or a remedial policy to be implemented by at least some of the plurality of firewall instances.

9. The first software-defined network node defined in claim 6, the operations further including:

identifying a second network traffic rule that affects a subset of a plurality of software-defined network nodes, the plurality of software-defined network nodes including at least the second, third and fourth software-defined network nodes; and causing firewall instances instantiated at the subset of the plurality of software-defined network nodes to enforce the second network traffic rule.

10. A non-transitory computer readable medium comprising computer readable instructions which, when executed, cause a processor of a first software-defined network node to perform operations including:

identifying, at a control plane, a network traffic rule to implement in a network;

determining, at the control plane, a first firewall of a distributed firewall in the network to enforce the network traffic rule;

configuring a second software-defined network node to route network traffic to the first firewall, the first firewall being instantiated by a first firewall instance at a third software-defined network node and by a second firewall instance at a fourth software-defined network node;

directing the third software-defined network node to instantiate the first firewall instance by directing the third software-defined network node to instantiate a first virtual machine to implement a first firewall application;

directing the fourth software-defined network node to instantiate the second firewall instance by directing the fourth software-defined network node to instantiate a second virtual machine to implement a second firewall application; and in response to determining at least some of the network traffic forwarded by the second software-defined network node to at least one of the third software-defined network node or the fourth software-defined network nodes is being dropped by at least one of the first firewall instance or the second firewall instance, causing the second software-defined network node to implement a third firewall instance.

11. The non-transitory computer readable medium defined in claim 10, the operations further including:

analyzing network event data collected at the first and second firewall instances; and based on the analyzing of the network event data, determining at least some of the network traffic forwarded by the second software-defined network node to the third software-defined network node is being dropped at the first firewall instance, or at least some of the network traffic forwarded by the second software-defined network node to the fourth software-defined network node is being dropped at the second firewall instance.

12. The non-transitory computer readable medium defined in claim 10, the operations further including:

analyzing network event data collected from a plurality of firewall instances, including the first and the second firewall instances; and based on the analyzing of the network event data, generating at least one of a remedial rule or a remedial policy to be implemented by at least some of the plurality of firewall instances.

13. The non-transitory computer readable medium defined in claim 10, the operations further including:

identifying a second network traffic rule that affects a subset of a plurality of software-defined network nodes, the plurality of software-defined network nodes including at least the second, third and fourth software-defined network nodes; and causing firewall instances instantiated at the subset of the plurality of software-defined network nodes to enforce the second network traffic rule.

14. The non-transitory computer readable medium defined in claim 10, wherein the first, second and third firewall instances operate to form the first firewall of the distributed firewall.

* * * * *